United States Patent
Tran et al.

(10) Patent No.: US 8,301,164 B2
(45) Date of Patent: *Oct. 30, 2012

(54) METHODS AND APPARATUS FOR PROVIDING MEDIA ON MOBILE DEVICES

(75) Inventors: Monica Tran, San Francisco, CA (US); Gavin Peacock, Walnut Creek, CA (US); James Roseborough, Piedmont, CA (US); David Lowell, San Francisco, CA (US); Aravind Nallan, San Jose, CA (US); Ian Farmer, Berkeley, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,925

(22) Filed: Mar. 21, 2012

(65) Prior Publication Data

US 2012/0180089 A1    Jul. 12, 2012

Related U.S. Application Data

(63) Continuation of application No. 11/859,688, filed on Sep. 21, 2007, now Pat. No. 8,165,598.

(60) Provisional application No. 60/849,153, filed on Oct. 2, 2006.

(51) Int. Cl.
*H04W 24/00* (2009.01)
*H04H 20/71* (2008.01)

(52) U.S. Cl. .................... 455/456.1; 455/3.01

(58) Field of Classification Search .......... 455/456.1, 455/404.2, 456.3, 414.3, 3.1; 725/60–62
See application file for complete search history.

(56) References Cited

U.S. PATENT DOCUMENTS

| | | | |
|---|---|---|---|
| 6,154,172 A | 11/2000 | Piccionelli et al. | |
| 6,671,738 B1 | 12/2003 | Rajchel et al. | |
| 6,785,542 B1 | 8/2004 | Blight et al. | |
| 6,832,093 B1 | 12/2004 | Ranta | |
| 7,092,943 B2 | 8/2006 | Roese et al. | |
| 7,212,097 B2 | 5/2007 | Yoshikawa | |
| 7,272,456 B2 | 9/2007 | Farchmin et al. | |
| 7,383,127 B2 | 6/2008 | Matsuo et al. | |
| 7,793,321 B2 * | 9/2010 | Simms et al. ........... | 725/39 |
| 2002/0138649 A1 | 9/2002 | Cartmell et al. | |
| 2004/0117831 A1 | 6/2004 | Ellis et al. | |
| 2004/0198386 A1 | 10/2004 | Dupray | |
| 2004/0205198 A1 | 10/2004 | Zellner et al. | |
| 2005/0027449 A1 | 2/2005 | Marsh | |
| 2005/0136983 A1 | 6/2005 | Agapi et al. | |

OTHER PUBLICATIONS

"U.S. Appl. No. 11/859,688, Notice of Allowability mailed Nov. 29, 2011", 9 pgs.

(Continued)

*Primary Examiner* — Melody Mehrpour
*Assistant Examiner* — Emem Stephen
(74) *Attorney, Agent, or Firm* — Kwan & Olynick LLP

(57) ABSTRACT

Techniques and mechanisms are provided for sending targeted content and data to mobile devices. Location information associated with a device is determined. In some instances, the location information is manually entered. In other instances, the location information is determined automatically from characteristics associated with the device. Location information can be obtained from global positioning system (GPS) data, cell-site triangulation, Internet Protocol (IP) address detection, etc. Content and advertising can be provided in a location relevant manner to the mobile device.

20 Claims, 19 Drawing Sheets

OTHER PUBLICATIONS

De Bonet, Jeremy S., "System and Method for Location Based Interaction with a Device", U.S. Appl. No. 11/439,544, filed May 24, 2006.

"U.S. Appl. No. 11/439,544, Non Final Office Action mailed Oct. 2, 2008", 8 pgs.

"U.S. Appl. No. 11/439,544, Final Office Action maiied Apr. 15, 2009", 10 pgs.

"U.S. Appl. No. 11/859,688, Response filed Apr. 13, 2011 to Non Final Office Action mailed Dec. 17, 2010", 6 pgs.

"U.S. Appl. No. 11/859,688, Response flied Sep. 20, 2010 to Non Final Office Action mailed Jun. 14, 2010", 5 pgs.

"U.S. Appl. No. 11/859,688, Final Office Action mailed Aug. 3, 2011", 10 pgs.

"U.S. Appl. No. 11/859,688, Notice of Allowance mailed Dec. 22, 2011", 11 pgs.

"U.S. Appl. No. 11/859,688, Non Final Office Action mailed Jun. 14, 2010", 8 pgs.

"U.S. Appl. No. 11/859,688, Non Final Office Action mailed Dec. 17, 2010", 9 pgs.

"U.S. Appl. No. 11/859,688, Appeal Brief filed Oct. 3, 2011", 6 pgs.

\* cited by examiner

Please enter your home
ZIP Code to customize
your guide:

94114

Exit | Network | OK

Figure 1F

| Date 201 | | Time Slot 211 | Time Slot 213 | Time Slot 215 |
|---|---|---|---|---|
| Channel 221 | icon 231 | Program 241 | | |
| Channel 223 | icon 233 | Program 243 | | Program 245 |
| Channel 225 | icon 235 | Program 247 | | |
| Channel 227 | icon 237 | Program 251 | Program 253 | |
| ............ | ......... | ........................ | | |
| ............ | ......... | ........................ | | |

Current Time 261

Figure 2

METHODS AND APPARATUS FOR PROVIDING MEDIA ON MOBILE DEVICES

CROSS-REFERENCE TO RELATED APPLICATIONS

The present invention claims priority of U.S. patent application Ser. No. 11/859,688, filed Sep. 21, 2007, which claims priority of Provisional U.S. Application No. 60/849,153, filed Oct. 2, 2006, both of which are incorporated herein by reference in their entirety.

DESCRIPTION OF RELATED ART

The present disclosure relates to methods and apparatus for providing media on mobile devices.

A variety of electronic communication mechanisms exist. Some mechanisms such as email, instant message, and the file transfer protocol allow communication of different types of content between particular parties. Other mechanisms such as social networking sites, video and photo sharing sites, provide users with some mechanisms for widely sharing or distributing content. However, each of these electronic communication mechanisms have limitations and drawbacks. Consequently, it is desirable to provide improved methods and apparatus for asynchronous communication and content sharing.

Overview

Techniques and mechanisms are provided for sending targeted content and data to mobile devices. Location information associated with a device is determined. In some instances, the location information is manually entered. In other instances, the location information is determined automatically from characteristics associated with the device. Location information can be obtained from global positioning system (GPS) data, cell-site triangulation. Internet Protocol (IP) address detection, etc. Content and advertising can be provided in a location relevant manner to the mobile device.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

FIGS. 1A-1L are diagrammatic representations showing examples of providing media on devices.

FIG. 2 is a diagrammatic representation showing another example of a program guide.

DESCRIPTION OF PARTICULAR EMBODIMENTS

Figure 1A:
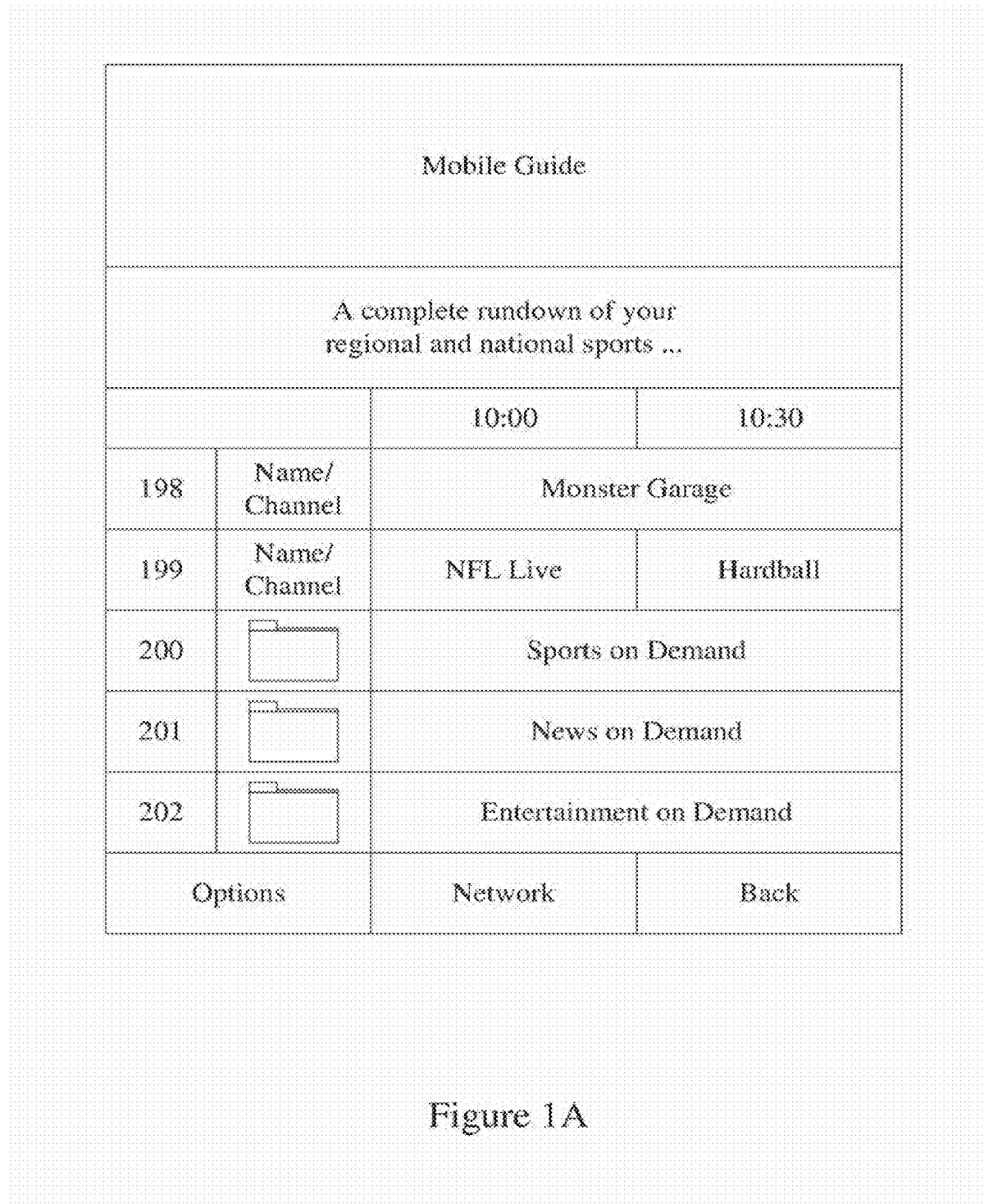
Figure 1B:
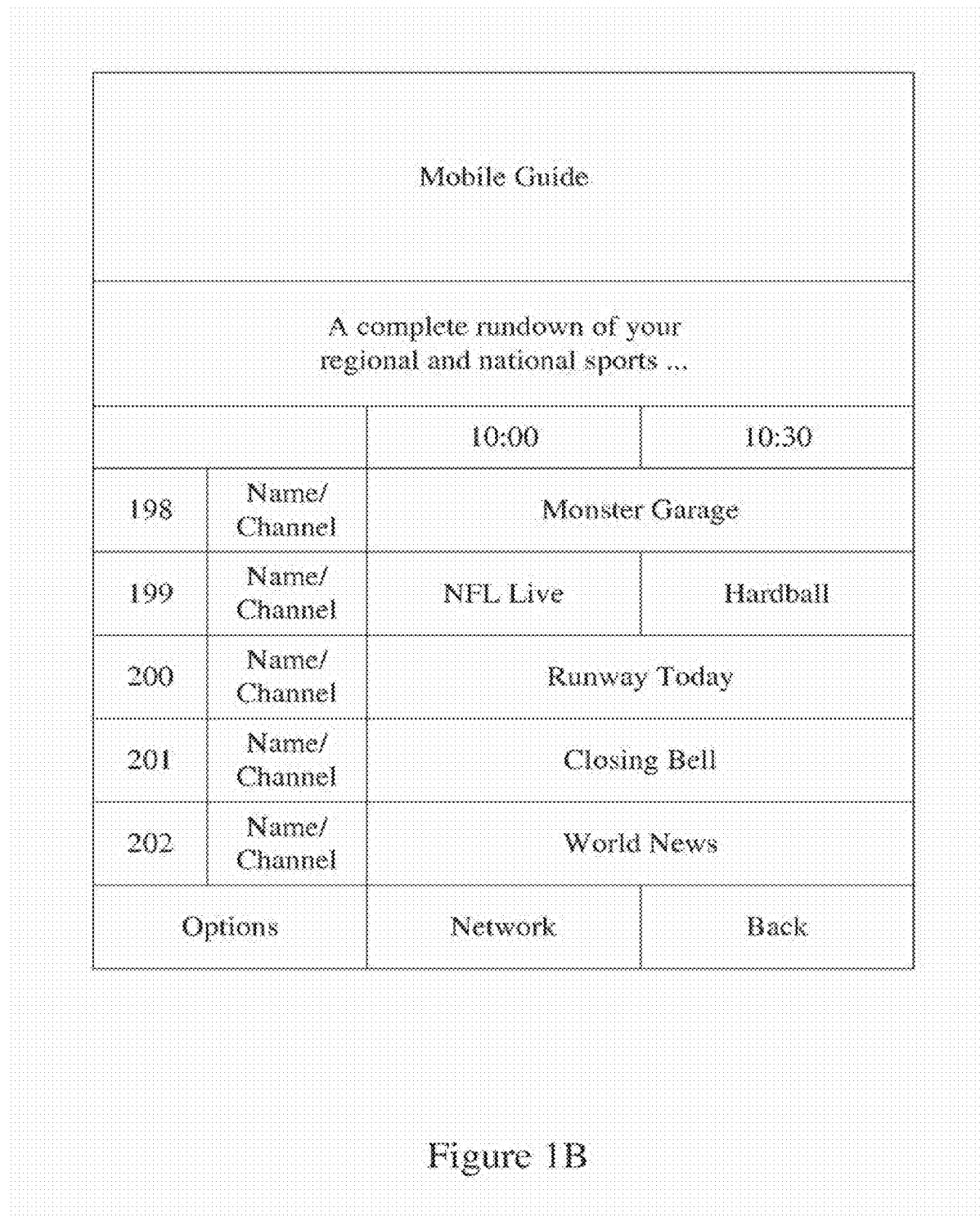
Figure 1C:
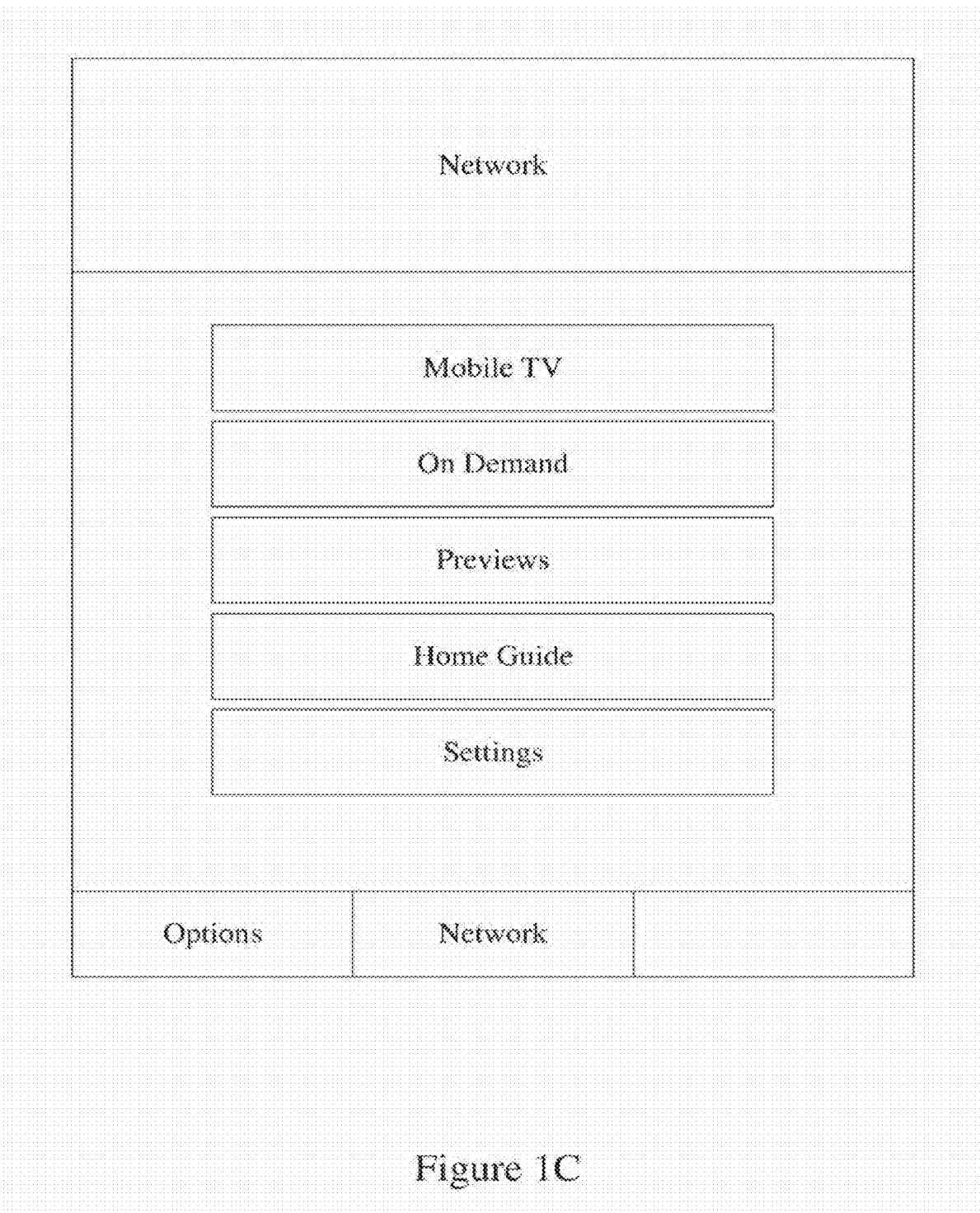
Figure 1D:
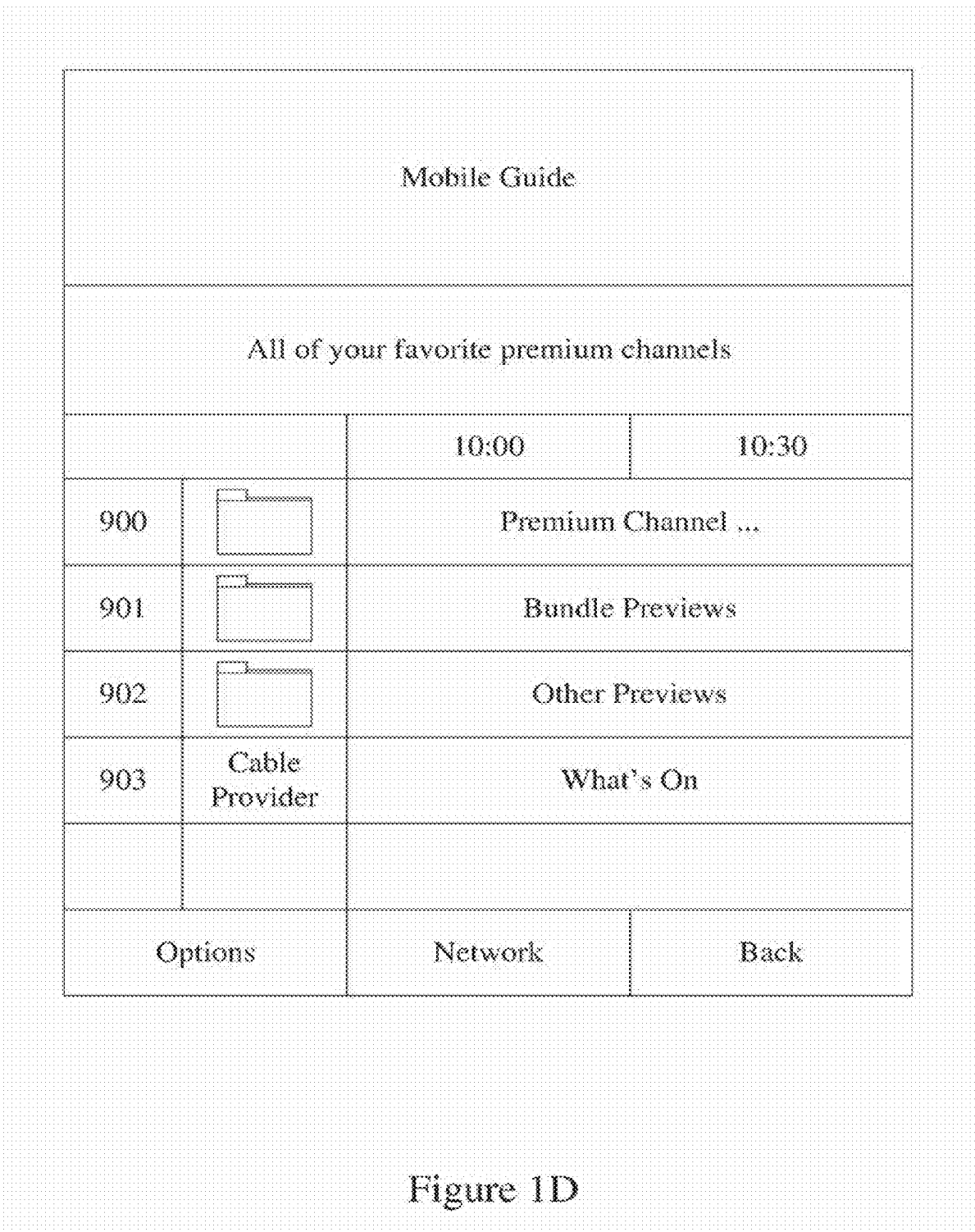
Figure 1E:
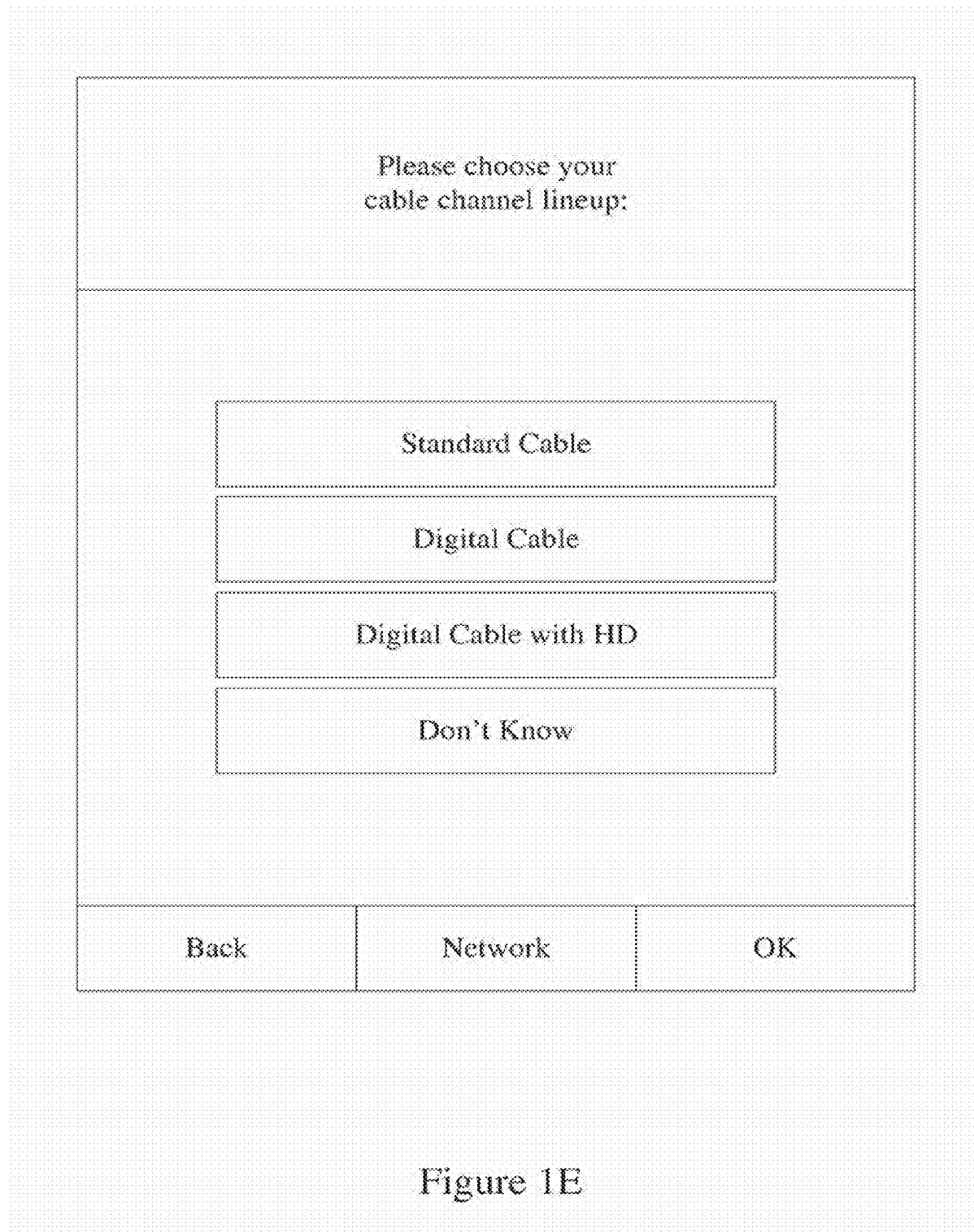
Figure 1G:
Figure 1H:
Figure 1I:
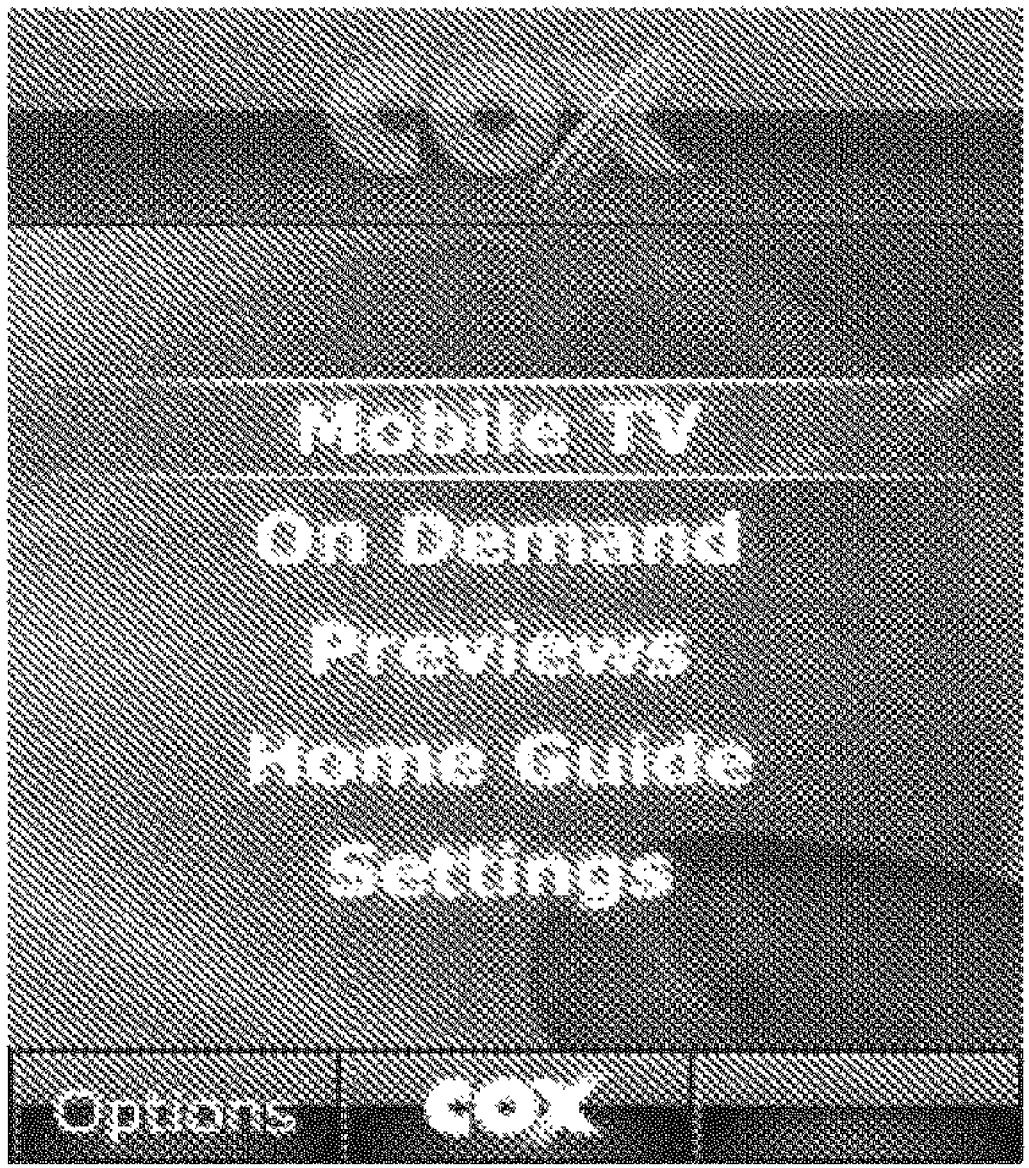
Figure 1J:
Figure 1K:
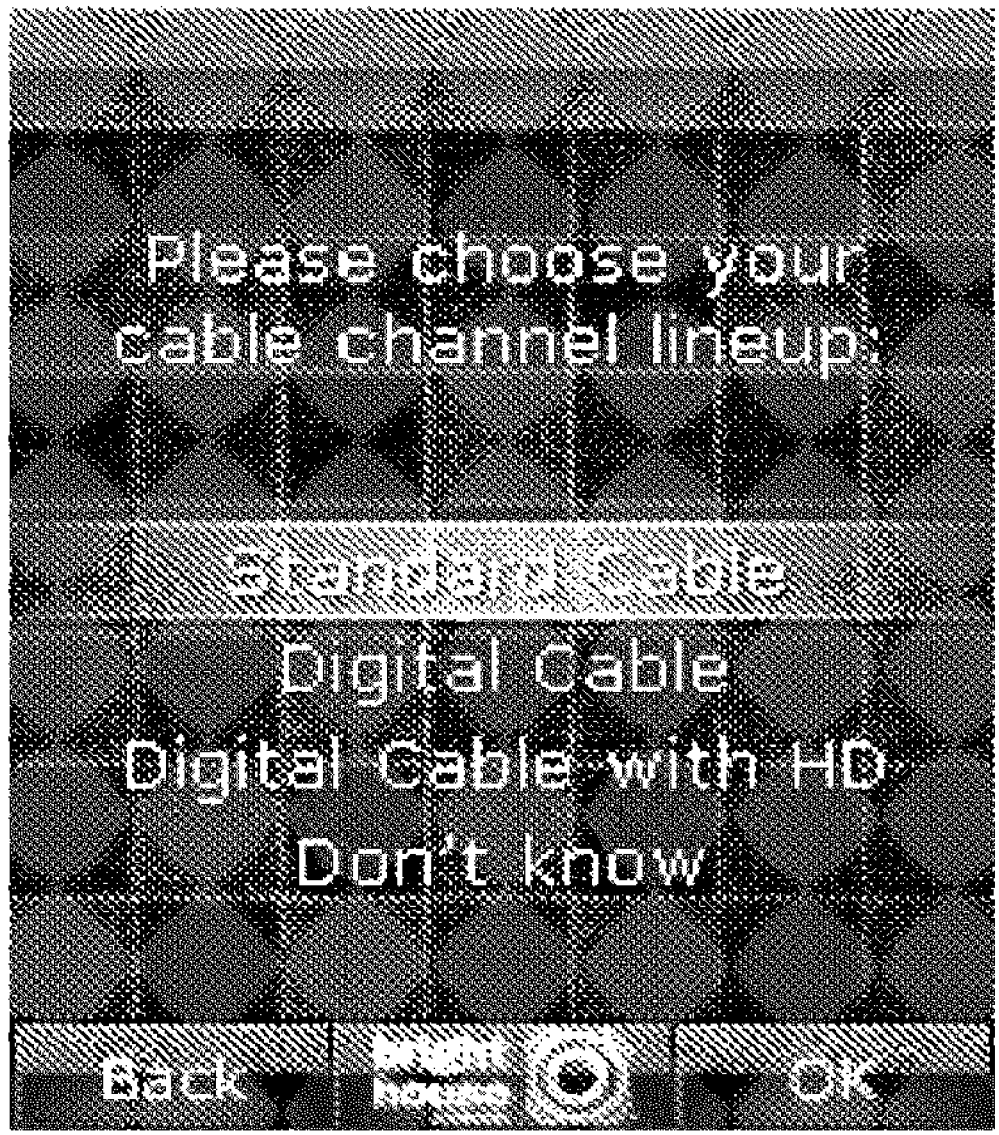
Figure 1L:
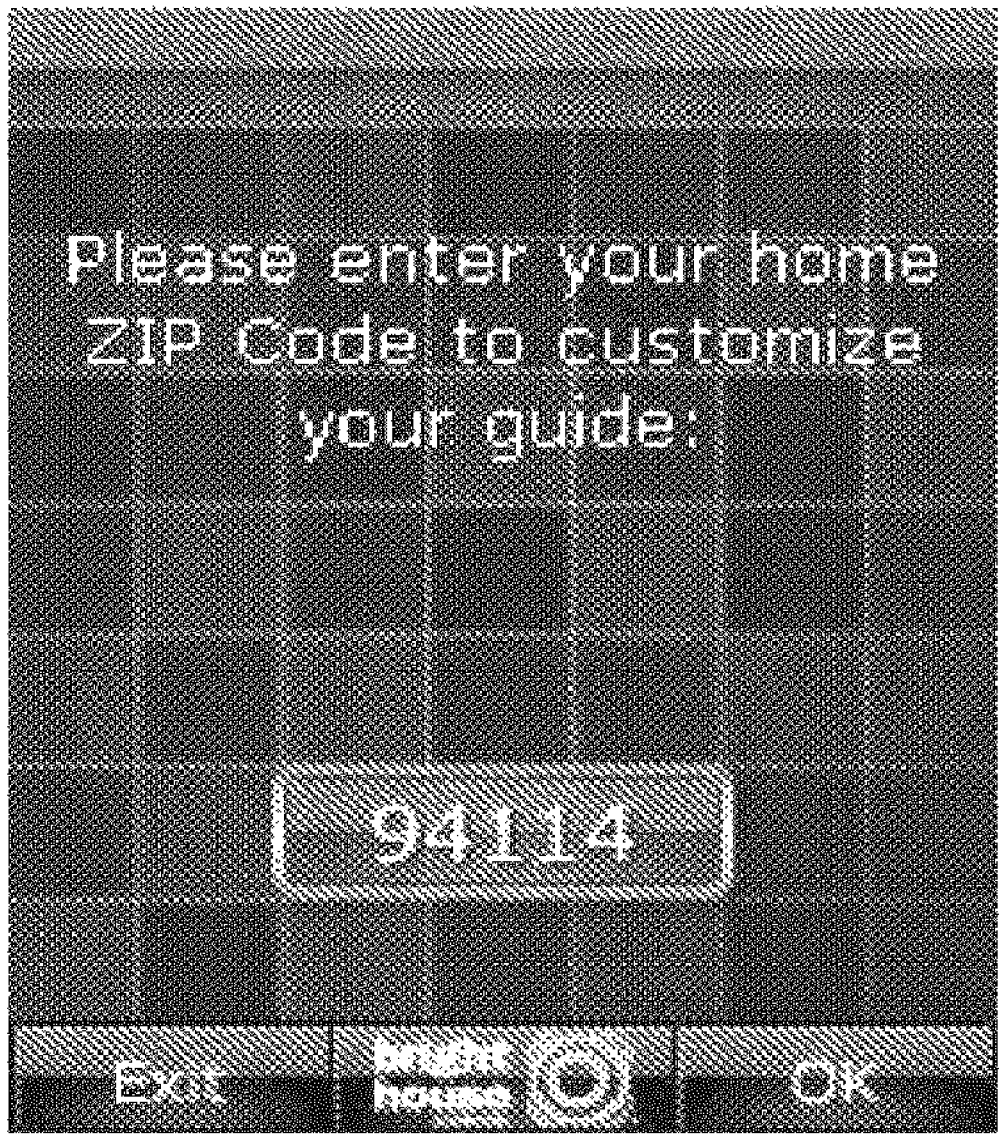

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended, to cover alternatives, modifications, and equivalents as may be included within the spirit and scope of the invention as defined by the appended claims.

For example, the techniques of the present invention will be described in the context of particular networks and particular devices. However, it should be noted that the techniques of the present invention can be applied to a variety of networks and devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while, remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

A variety of devices have the capability of providing audio and video streams such as live television or live radio. Some examples of devices include mobile devices such as mobile phones, personal digital assistants, portal computing devices, etc. Many of these devices also are able to present program guides corresponding to the audio and video streams. Program guides include information that can be useful in selecting programs for viewing or listening. For examples, program guide information may include time slots, channels, icons, program listings included, in time slots for particular channels, details on program listings, reviews, graphics, etc.

FIGS. 1A-1L are diagrammatic representations showing examples of providing media on devices. According to various embodiments, the devices are capable of displaying program guide information that allows users to browse various types of content. In particular examples, live channels are displayed alongside video on demand clips, and television channels are displayed alongside audio and/or radio channels. Premium un-purchased channels are also displayed alongside previously purchased content. In many examples, the various types of content can be differentiated by color. Each program can be viewed when a user selects a channel/clip. According to various embodiments, selecting a channel or clip launches an application such as a streaming media player capable or playing the media stream.

Bookmarking within the program guide allows users to jump to a specific section of the program guide. For example, if a user selects "Previews" from a menu, the program guide can be configured to open the location where preview folders and channels are located in the mobile guide. Actual folders are optional, as different sections of a program guide can operate to categorize content. A bookmark allows a user to jump to the appropriate section. Home guide zip code entry allows users to enter their zip code and select their current plan to pull up information specific to their area. In other examples, area can be automatically determined based on the location of the device. For example, location may be determined, automatically based on global positioning system (GPS) data available from a device such as a mobile device. The location may also be determined automatically based on cell site triangulation information. Triangulation can use the strength or angle of a received signal to determine location of a device from a cell site. Triangulation can be performed entirely using ground networks.

In one example, TDOA (time-difference-on-arrival) measurements are determined. The location of a mobile device is determined by measuring the differences in transmission time between a mobile device and individual cell sites. The cell site receiving the strongest signal is typically the cell site closest to the mobile device. Using three of more stations allows a mobile device location to be determined with relative precision. In some examples, a mobile device may be located at a wireless access point. An Internet Protocol (IP) address associated with Internet access can be used to determine the location of the mobile device. By obtaining location information associated with a mobile device, a user experience can be improved, as more targeted information can be provided to the user. For example, user guides and advertising specific to the user's location can be provided to the mobile device, along with weather updates, traffic information, or any other information that has location pertinence.

FIG. 2 is a diagrammatic representation showing another example of a program guide. In some examples, the time slots 211, 213, and 215 are each 30 minute time slots covering a time range from 1 pm to 2:30 pm. In one example, time slot 211 has a beginning time slot boundary of 1 pm and an end time slot boundary of 1:30 pm. Time slot 213 has a beginning time slot boundary of 1:30 pm and an end time slot boundary of 2:00 pm. Time slot 215 has a beginning time slot boundary of 2 pm and an end time slot boundary of 2:30 pm. Program 241 runs through time slots 211, 213, and 215. Program 243 runs through time slot 211 and time slot 213. Program 245 runs through time slot 215. It should be noted that various programs may also run through other time slots not shown. Program 247 runs through time slots 211, 213, and 215. Program 251 runs through time slot 211. Program 253 runs through time slots 213 and 215.

The program guide also identifies channels 221, 223, 225, and 227. In some examples, program guide structure information including a table of hundreds of channels is downloaded first and program listings are downloaded subsequently. Icons 231, 233, 235, and 237 are also provided for the various channels. In typical implementations, a current time 281 is used to determine what portion of a program guide can be viewed. According to various embodiments, a current time is after time slots 211 and 213. For example, the current time may be 2:05 pm. The current time 2:05 pm is passed the end time slot boundaries for time slot 211 and 213 of 1:30 pm and 2:00 pm respectively. Nonetheless, program information included in time slots 211 and 213 can still be viewed. In particular examples, the program information can be viewed until a predetermined period of time after a user scrolls away from the time slots 211 and 213. In other examples, the program information can be viewed indefinitely.

Figure 3:
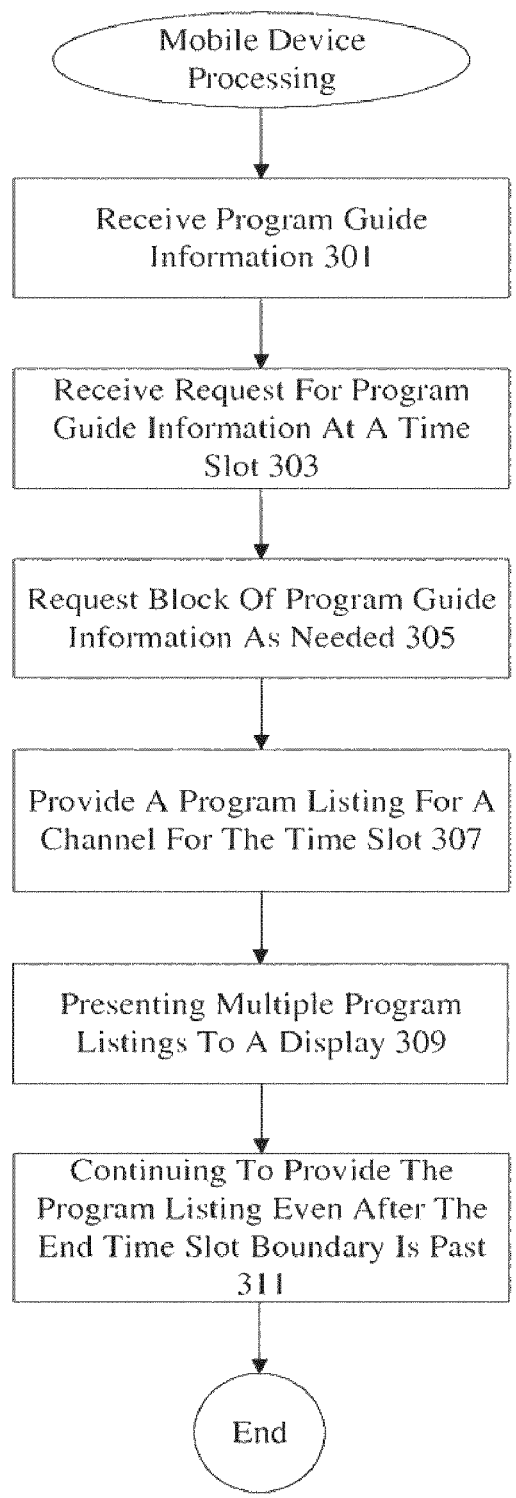
FIG. 3 is a flow process diagram showing one example of a device processing requests for guide information.

FIG. 3 is a flow process diagram showing one example of a device processing requests for guide information. At 301, a device receives program guide information. The program guide information can be received in a variety of manners. In some instances, program guide information is received first as program guide structure information with program guide content received subsequently. At 303, a device receives a request for program guide information. The request may originate from a user of the device. The request is typically associated with one or more time slots, one or more channels, one or more program titles. For example, the request may be to view channels 300-305 for time slots 4:00 pm-5:30 pm. At 305, additional program guide information may be requested. At 307, a program listing is provided for the channel at time slot 307. It should be noted that the program listing may be a single program title or numerous program titles. In particular embodiments, a program listing is a program shown at a time slot on a particular channel.

Multiple program listings are provided to a display at 309. The program listings may be for any variety of media stream. At 311, the program listing information for a particular time slot remains on the display even after the current time passes the time slot end boundary. For example, program information remains for time slot 3 pm.-3:30 pm even at 3:42 pm. In some examples, program information for past time slots remains in a device memory so that it can be accessed for a predetermined period of time the time slot end boundary passes. For example, it may be accessible for up to a day after the time slot end boundary passes. Alternatively, it may be accessible indefinitely, as the program guide information can be obtained again from a server if it is no longer held on device memory.

A program guide can be created by a guide generator from information provided by a variety of content providers. According to various embodiments, the program guide can include program guide structure information and program guide content information. The program guide structure information may include simply a basic listing of channels without having program guide content information for hundreds or thousands of channels. The program guide content information may be downloaded dynamically. Consequently, program guide content for past time slots or even time slots on previous days can be dynamically obtained without using excessive memory on a device.

Figure 4:
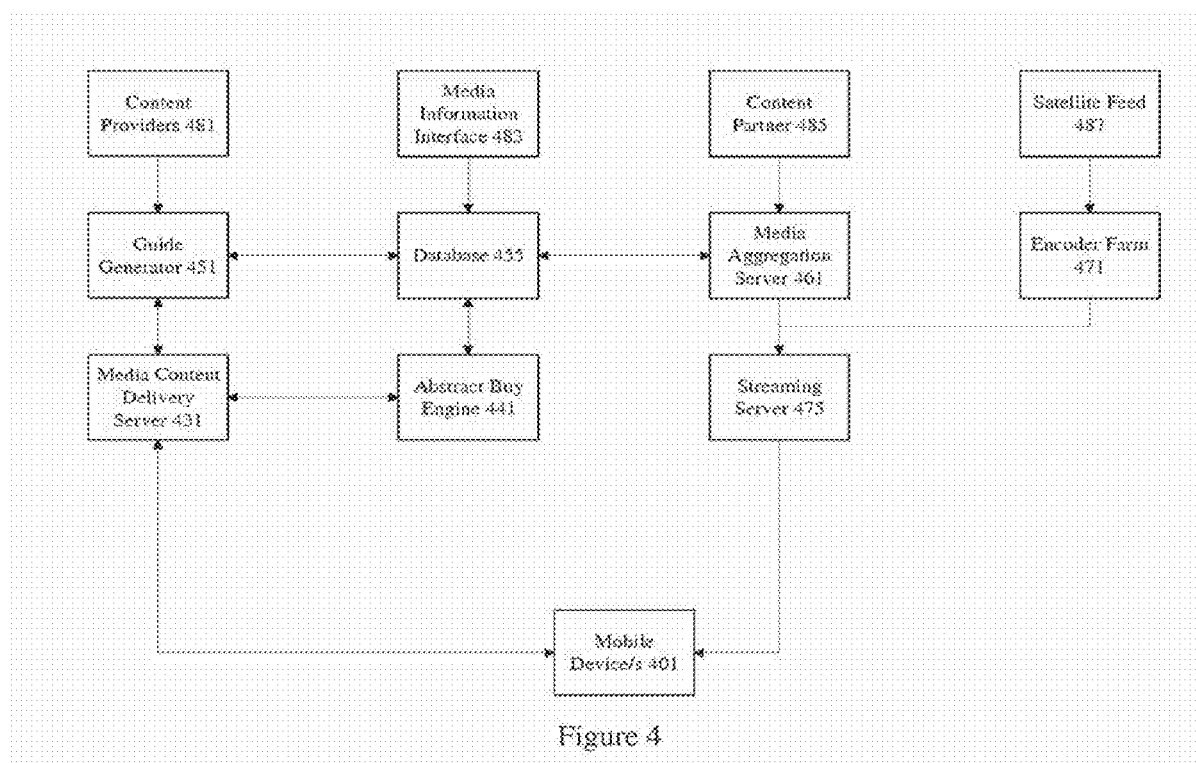
FIG. 4 is a diagrammatic representation showing one example of a network that can use the techniques of the present invention.

FIG. 4 is a diagrammatic representation showing one example of a network that can use the techniques of the present invention. Although one particular example showing particular devices is provided, it should be noted that the techniques of the present invention can be applied to a variety of a computing devices and networks. According to various embodiments, the techniques of the present invention can be used on any device having a processor, memory, display, the capability of showing program guide information, the capability of obtaining program guide information over some type of network, such as wireless, cable, telephony, etc.

According to various embodiments, media content is provided from a number of different sources 485. Media content may be provided from film libraries, cable companies, movie and television studios, commercial and business users, etc, and maintained at a media aggregation server 461. Any mechanism for obtaining media content from a large number of sources in order to provide the media content to mobile devices in live broadcast streams is referred to herein as a media content aggregation server. The media content aggregation server 461 may be clusters of servers located in different data centers. According to various embodiments, content provided to a media aggregation server 461 is provided in a variety of different encoding formats with numerous video and audio codecs. Media content may also be provided via satellite feed 457.

An encoder farm 471 is associated with the satellite feed 487 and can also be associated with media aggregation server 461. The encoder farm 471 can be used to process media content from satellite feed 487 as well as possibly from media aggregation server 461 into potentially numerous encoding formats. The media content may also be encoded to support a variety of data rates. The media content from media aggregation server 461 and encoder farm 471 is provided as live media to a streaming server 475.

Possible client devices 401 include personal digital assistants (PDAs), cellular phones, personal computing devices, etc. According to various embodiments, the client devices are connected to a cellular network run by a cellular service provider. Cell towers typically provide service in different areas. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 431. The media content delivery server 431 is configured to allow a client device 401 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media.

In other implementations, it is possible that the media content delivery server also provides media clips, files, and streams. The media content delivery server is associated with a guide generator 451. The guide generator 451 obtains information from disparate sources including content providers 481 and media information sources 483. The guide generator 451 provides program guides to database 455 as well as to media content delivery server 431 to provide to mobile devices 401. The media content delivery server 431 is also associated with an abstract buy engine 441. The abstract buy engine 441 maintains subscription information associated with various client devices 401. For example, the abstract buy engine 441 tracks purchases of premium packages.

The media content delivery server 431 and the client devices 401 communicate using requests and responses. For example, the client device 401 can send a request to media content delivery server 431 for a subscription to premium content. According to various embodiments, the abstract buy engine 441 tracks the subscription request and the media content delivery server 431 provides a key to the client 401 to allow it to decode live streamed media content. According to various embodiments, all client devices 401 have access to media content broadcast over the airwaves. However, only client devices 401 authorized by a media content delivery server 431 can actually display certain media content. Similarly, the client device 401 can send a request to a media content delivery server 431 for a program guide for its particular program package. The media content delivery server 431 obtains the guide data from the guide generator 451 and associated database 455 and provides appropriate guide information to the client device 401.

Although the various devices such as the guide generator 451, database 455, media aggregation server 461, etc. are shown as separate entities, it should be appreciated that various devices may be incorporated onto a single server. Alternatively, each device may be embodied in multiple servers or clusters of servers. According to various embodiments, the guide generator 451, database 455, media aggregation server 461, encoder farm 471, media content delivery server 431, abstract buy engine 441, and streaming server 475 are included in an entity referred to herein as a media content delivery system.

Figure 5:
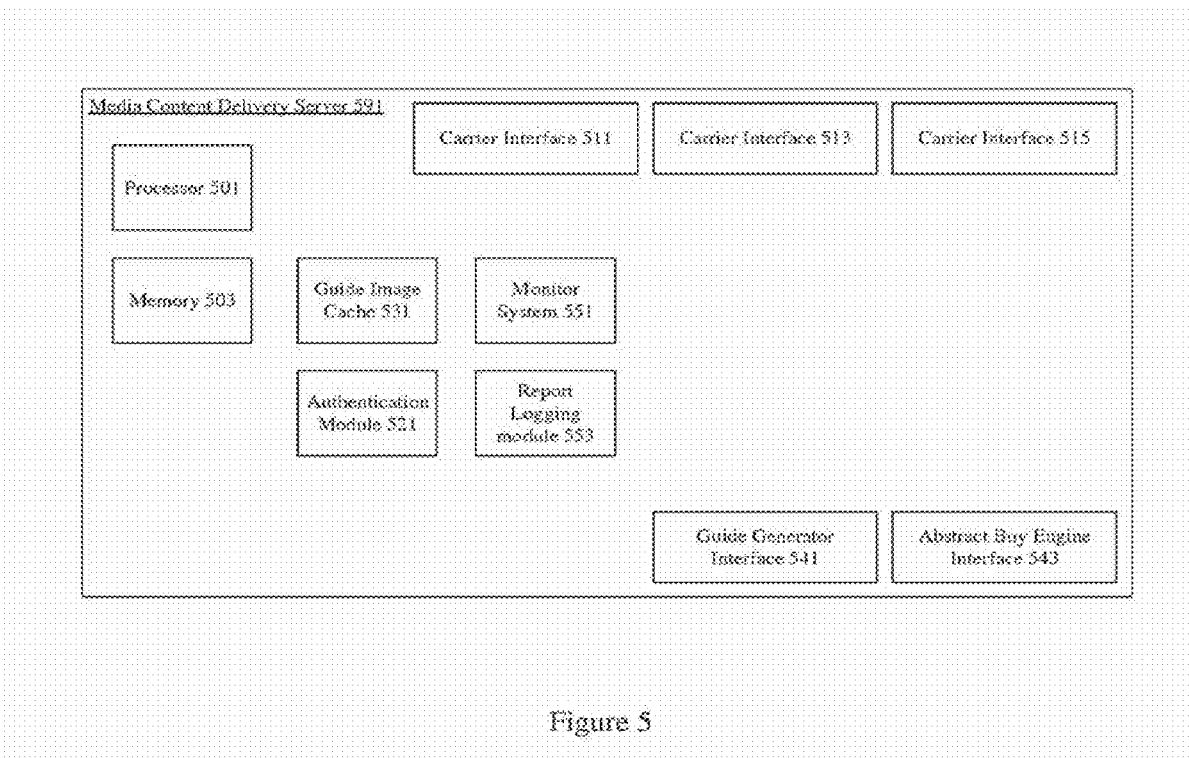
FIG. 5 is a diagrammatic representation showing one example of a media content delivery server.

FIG. 5 is a diagrammatic representation showing one example of a media content delivery server 591. According to various embodiments, the media content delivery server 591 includes a processor 501, memory 503, and a number of interfaces, in some examples, the interfaces include a guide generator interface 541 allowing the media content delivery server 591 to obtain program guide information. The media content delivery server 591 also can include a program guide cache 531 configured to store program guide information and data associated with various channels. The media content delivery server 591 can also maintain static information such as icons and menu pages. The interfaces also include a carrier interface 511 allowing operation with mobile devices such as cellular phones operating in a particular cellular network. The carrier interface allows a carrier vending system to update subscriptions. Carrier interfaces 513 and 515 allow operation with mobile devices operating in other wireless networks. An abstract buy engine interface 543 provides communication with an abstract buy engine that maintains subscription information.

An authentication module 521 verifies the identity of mobile devices. A logging and report generation module 553 tracks mobile device requests and associated responses. A monitor system 551 allows an administrator to view usage patterns and system availability. According to various embodiments, the media content delivery server 591 handles requests and responses for media content related transactions while a separate streaming server provides the actual media streams. Media streams are broadcast to mobile devices, but mobile devices are not configured to access and a user is not able to view media content unless appropriate authorizations are made through a media content delivery server 591. In some instances, a media content delivery server 591 may also have access to a streaming server or operate as a proxy for a streaming server. But in other instances, a media content delivery server 591 does not need to have any interface to a streaming server. In typical instances, however, the media content delivery server 591 also provides some media streams. The media content delivery server 591 can also be configured to provide media clips and files to a user in a manner that supplements a streaming server.

Although a particular media content delivery server 591 is described, it should be recognized that a variety of alternative configurations are possible. For example, some modules such as a report and logging module 553 and a monitor 551 may not be needed on every server. Alternatively, the modules may be implemented on another device connected to the server. In another example, the server 591 may not include an interface to an abstract buy engine and may in fact include the abstract buy engine itself. A variety of configurations are possible.

Figure 6:
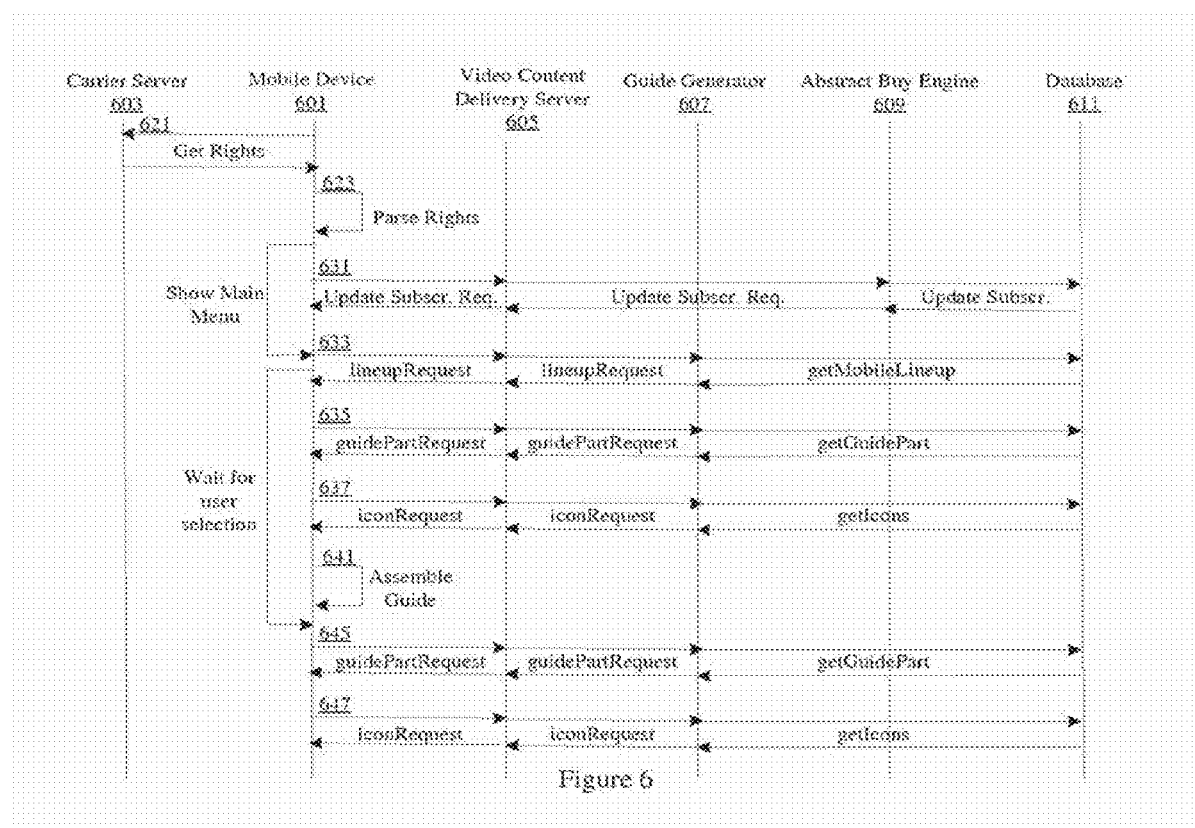
FIG. 6 is an exchange diagram showing one example of a mobile guide delivery sequence.

FIG. 6 is an exchange diagram showing one example of a mobile guide delivery sequence. A mobile device 601 obtains subscription service rights information from a carrier server 603. According to various embodiments, the mobile device parses and displays information associated with the rights at 623. In one example, a root menu showing subscribed and available channels is shown.

According to various embodiments, the mobile device 601 sends an update subscriptions request message at 631 to a media content delivery server 605. The media content delivery server 605 forwards the update subscriptions request message to an abstract buy engine 609. The abstract buy engine 609 sends an update subscriptions message to the database 611. The mobile device 601 also sends a lineup request message 635 to the media content delivery server 605. The lineup request message is forwarded to a guide generator 607. The guide generator obtains a lineup for the mobile device from the database 611. The abstract buy engine 609 is not involved in this particular request transaction. At 635, the mobile device sends a guide part request to the media content delivery server 605. In some examples, the request is a request for the entire program guide. In typical examples, the request is a request for a portion of the guide or a program guide information block. The program guide information block request is forwarded to a guide generator 607. The guide generator obtains the guide part from a database 611 or generates it based on other information.

In some examples, icons are also requested by the mobile device 601 at 637. The mobile device 601 sends an icon request to the media content delivery server 605. The media content delivery server 605 forwards the icon request to the guide generator 607. The guide generator obtains icons from the database 611. According to various embodiments, other information such as advertisements and media clips are also requested or provided along with the icons. At 641, the guide is assembled at the mobile device 601. The user can then scroll through the guide or jump to a particular location in the guide. Some portions of the guide may not yet be downloaded. Consequently, additional guide part requests and icon requests may be sent by a mobile device 601 at 645 and 647. The additional program guide information block requests and icon requests at 645 and 647 may be sent for different channels, different channel blocks, or different time periods.

Figure 7:
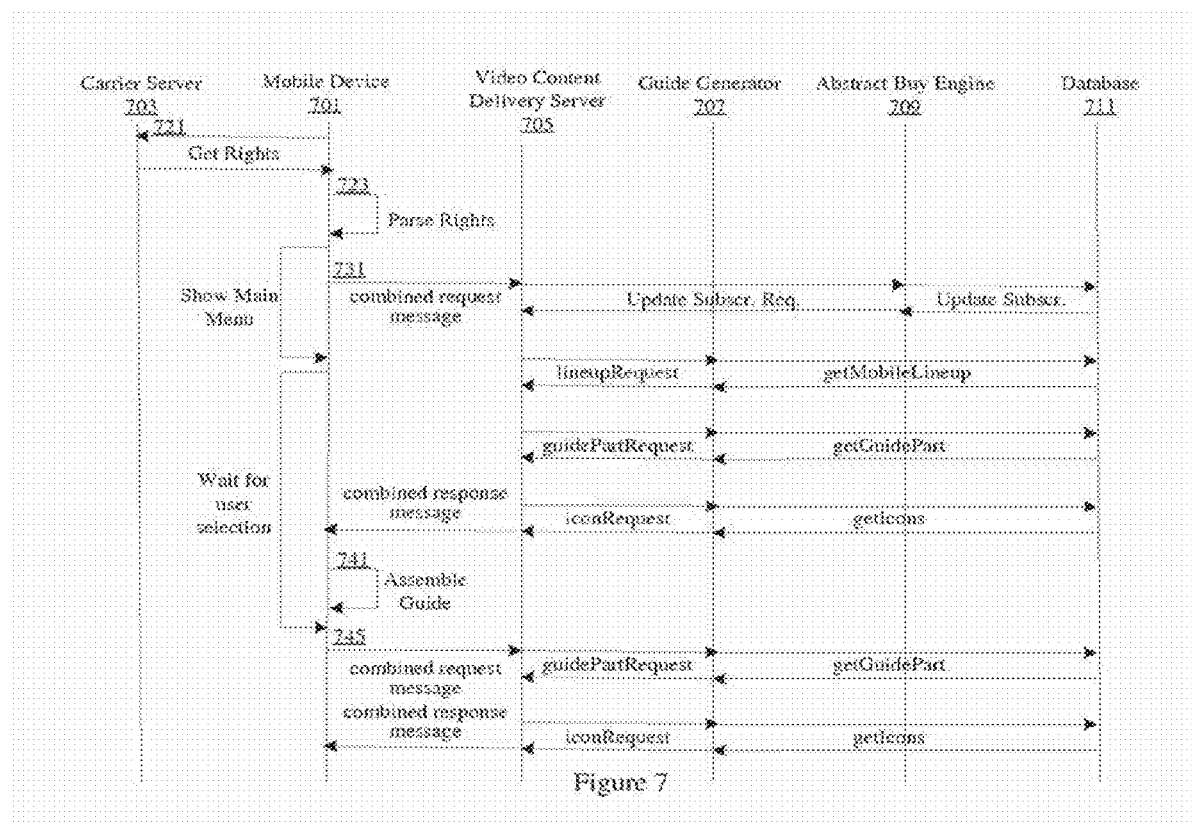
FIG. 7 is an exchange diagram showing one example of a mobile guide delivery sequence where multiple requests are included in a request message.

FIG. 7 is an exchange diagram showing one example of a mobile guide delivery sequence where multiple requests are included in a request message. A mobile device 701 obtains descriptor information from a carrier server 703. In one example, descriptor information is subscription service information. The subscription service information provides subscription and menu information to the mobile device 701. According to various embodiments, the mobile device parses and displays information associated with the rights at 723. In one example, a root menu showing subscribed and available channels is shown.

According to various embodiments, the mobile device 701 sends an update subscriptions request message at 731 to a media content delivery server 705. The update subscriptions request message also includes a lineup request, a guide part request, and an icon request.

To improve efficiency, it is possible to reduce the total number of round trips between a mobile device 701 and a media content delivery server 705. Therefore, it is beneficial to batch together many of these mobile device 701 requests into a single message 731 sent to the media content delivery server 705. The server responses can similarly be sent as a single message back to the mobile device 701. In one example, the following XML code could used to batch requests into a single request message:

```
<mobiTalkRequest version="1.0" haltOnFailure="true">
    <request>
        <updateSubscriptionsRequest userId="xyz">
        </updateSubscriptionsRequest>
    </request>
    <request>
        <iconRequest userId="xyz" iconIdList="74,23" />
    </request>
    <request>
        <lineupDetailRequest idList="74,23,101" ... />
    </request>
</mobiTalkRequest>
```

According to various embodiments, it is also possible to increase the number of requests that can be included in a single message by allowing results from early requests in the batch to make their way as inputs into the later requests in the message. For example, the following batch includes a newAccountRequest which creates a new "userId" and a lineupRequest which takes "userId" as an argument:

```
<mobiTalkRequest version="1.0" haltOnFailure="true">
    <request>
        <newAccountRequest vendorUserId="abc" vid="FOO-BAR"
        ... />
    </request>
    <request>
        <lineupRequest userId="{USERID}" guideType="mobile" ... />
    </request>
</mobiTalkRequest>
```

The name of intermediate results such as "USERID" in the above example can be well-known from the protocol documentation, or can be explicitly named in the protocol, such as:

```
<mobiTalkRequest version="1.0" haltOnFailure="true">
    <request>
        <newAccountRequest vid="FOO-BAR"
        userIdResultName="USERID"
            customerNumResultName="CUSTNUM" ... />
    </request>
    <request>
        <lineupRequest userId="{USERID}" guideType="mobile" ... />
    </request>
</mobiTalkRequest>
```

According to various embodiments, these intermediate results can be implemented on the server by an associative array with names and values that get filled in during the processing of the batch. In some example, before processing any request in the batch, the server replaces all intermediate result names in that request (such as "{USERID}" above) with the corresponding value computed earlier in the batch and stored in the associative array.

The media content delivery server 705 extracts the requests from the request message received from the mobile device 701. The media content delivery server 705 forwards the update subscriptions request message to an abstract buy engine 709. The abstract buy engine 709 sends an update subscriptions message to the database 711. The lineup request message is forwarded to a guide generator 707. The guide generator obtains a lineup for the mobile device from the database 711. At 735, the mobile device sends a guide part request to the media content delivery server 705. In some examples, the request is a request for the entire program guide. In typical examples, the request is a request for a portion of the guide. The guide part request is forwarded to a guide generator 707. The guide generator obtains the guide part from a database 711. The mobile device 701 sends an icon request to the media content delivery server 705. The media content delivery server 705 forwards the icon request to the guide generator 707. The guide generator obtains icons from the database 711. According to various embodiments, other information such as advertisements and media clips are also requested or provided along with the icons. A single response is sent from the media content delivery server 705 to the mobile device 701.

At 741, the guide is assembled at the mobile device 701. The user can then scroll through the guide or jump to a particular location in the guide. Some portions of the guide may not yet be downloaded. Consequently, additional guide part requests and icon requests may be sent by a mobile device 701 at 745 in batched format. The additional requests at 745 may be sent for a different block of channels or a different time period.

Figure 8:
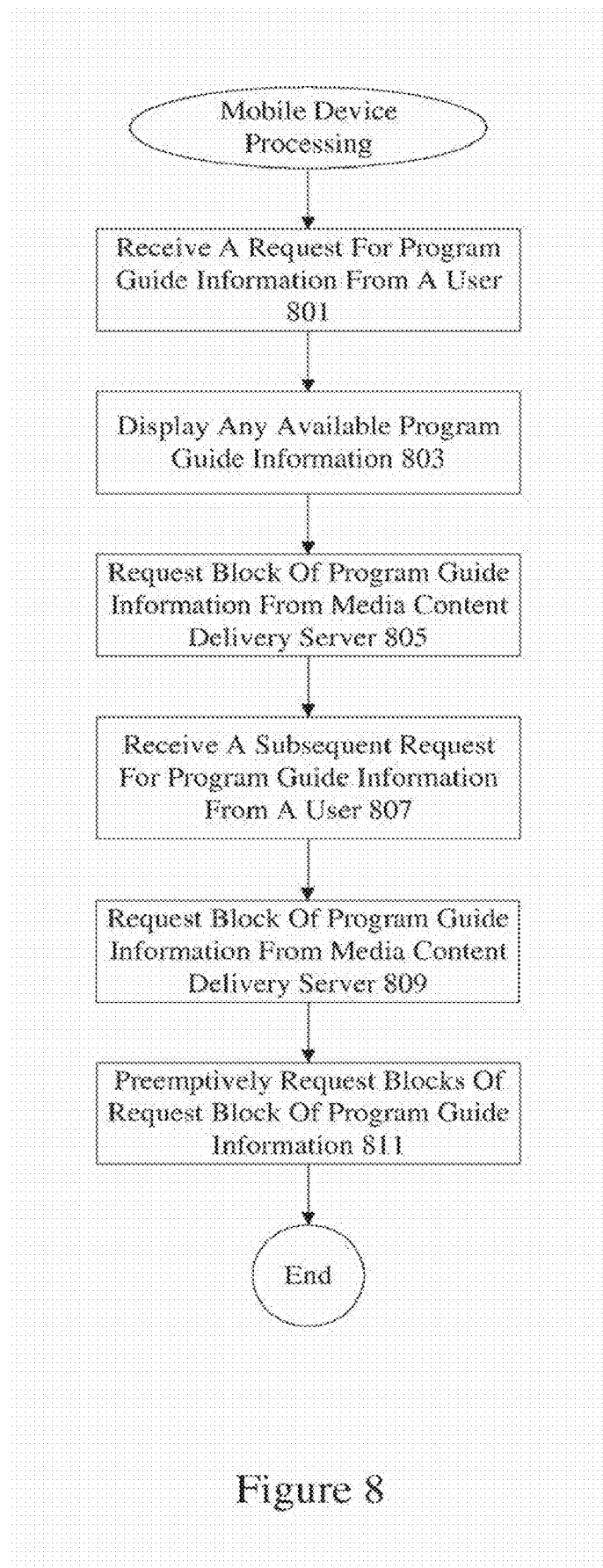
FIG. 8 is a flow process diagram showing one example of a request for program guide information.

FIG. 8 is a flow process diagram showing one example of a request for program guide information. At 801, a request for program guide information is received from a user. The request may result from a user selection to view a certain portion of a program guide. According to various embodiments, some program guide information may already be available on the device. For example, a listing of channels may be available. At 803, any program guide information available is displayed. At 805, a mobile device requests a block of program guide information from a media content delivery server. The block of program guide information may have a size determined by the screen of a mobile device. Alternatively, the block of program guide information may have a size determined by the amount of memory available on the mobile device. Other considerations such as bandwidth availability can also be taken into account. At 807, a mobile device receives a subsequent request from a user for program guide information.

According to various embodiments, the subsequent request results from a user scrolling, jumping, or otherwise navigating to a particular portion of a program guide. If the mobile device does not already have the information, the block of program guide information is requested from a media content delivery server at 809. It should be noted that program guide information can also be requested from other entities related to media content delivery servers. At 811, blocks of program guide information can be preemptively requested. Alternatively, blocks of program guide information can be preemptively provided to a mobile device. A variety of mobile devices can be used. According to various embodiments, a mobile device includes a display, a processor, memory, an interface operable to communicate with a media content delivery server, and an input interface operable to allow a user to operate the device. Possible mobile devices include cellular phones, personal digital assistants, portable computing devices, etc.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

Because such information and program instructions may be employed, to implement the systems/methods described herein, the present invention relates to tangible, machine readable media that include program instructions, state information, etc. for performing various operations described, herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of master and slave components and should not be restricted to the ones mentioned above. Although shared I/O lines have been described in the context of a memory controller and a simultaneous multiple master component switch fabric, shared I/O lines can be used in a system without a memory controller and/or without a simultaneous multiple master component switch fabric. It is therefore intended that the invention be interpreted to include all variations and equivalents that fall within the true spirit and scope of the present invention.

The invention claimed is:

1. A method comprising:
    receiving a request for program guide information, the request received from a device at a first location;
    sending program guide information to the device, the program guide information for a first block of channels for a first time slot;
    receiving a subsequent request for program guide information, the request received from the device at a second location, wherein the subsequent request is triggered by user interaction with the device; and
    sending additional program guide information to the device, the additional program guide information for a second block of channels for the same first time slot, wherein the second block of channels comprise channels not included in the first block of channels.

2. The method of claim 1, wherein the request is received from the device at the first location and the subsequent request is received from the device at a second location.

3. The method of claim 1, wherein program guide information is sent with advertising corresponding to the first location of the device.

4. The method of claim 3, wherein additional program guide information is sent with advertising corresponding to the second location of the device.

5. The method of claim 1, wherein a request for a program included in the program guide information is received.

6. The method of claim 5, wherein the program is sent with advertising corresponding to the first location of the device.

7. The method of claim 1, wherein the first block of channels does not include a program subject to blackout restrictions particular to the first location.

8. The method of claim 7, wherein the second block of channels includes the program.

9. The method of claim 1, wherein the first location is provided by a component included on the device.

10. A system comprising:
- an input interface operable to receive a request for program guide information, the request received from a device at a first location;
- a processor operable to identify a first block of channels;
- an output interface operable to send program guide information to the device, the program guide information for the first block of channels for a first time slot;
- wherein a subsequent request for program guide information is received from the device at a second location, wherein the subsequent request is triggered by user interaction with the device, wherein additional program guide information is sent to the device, the additional program guide information for a second block of channels for the same first time slot, wherein the second block of channels comprise channels not included in the first block of channels.

11. The system of claim 10, wherein the request is received from the device at the first location and the subsequent request is received from the device at a second location.

12. The system of claim 10, wherein program guide information is sent with advertising corresponding to the first location of the device.

13. The system of claim 12, wherein additional program guide information is sent with advertising corresponding to the second location of the device.

14. The system of claim 10, wherein a request for a program included in the program guide information is received.

15. The system of claim 14, wherein the program is sent with advertising corresponding to the first location of the device.

16. The system of claim 10, wherein the first block of channels does not include a program subject to blackout restrictions particular to the first location.

17. The system of claim 16, wherein the second block of channels includes the program.

18. The system of claim 10, wherein the first location is provided by a component included on the device.

19. A non-transitory computer readable medium comprising:
- computer code for receiving a request for program guide information, the request received from a device at a first location;
- computer code for sending program guide information to the device, the program guide information for a first block of channels for a first time slot;
- computer code for receiving a subsequent request for program guide information, the request received from the device at a second location, wherein the subsequent request is triggered by user interaction with the device; and
- computer code for sending additional program guide information to the device, the additional program guide information for a second block of channels for the same first time slot, wherein the second block of channels comprise channels not included in the first block of channels.

20. The non-transitory computer readable medium of claim 19, wherein the request is received from the device at the first location and the subsequent request is received from the device at a second location.

* * * * *